---

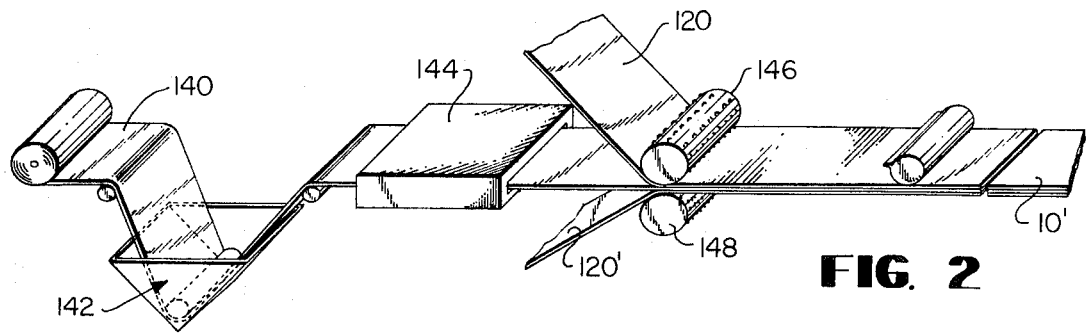
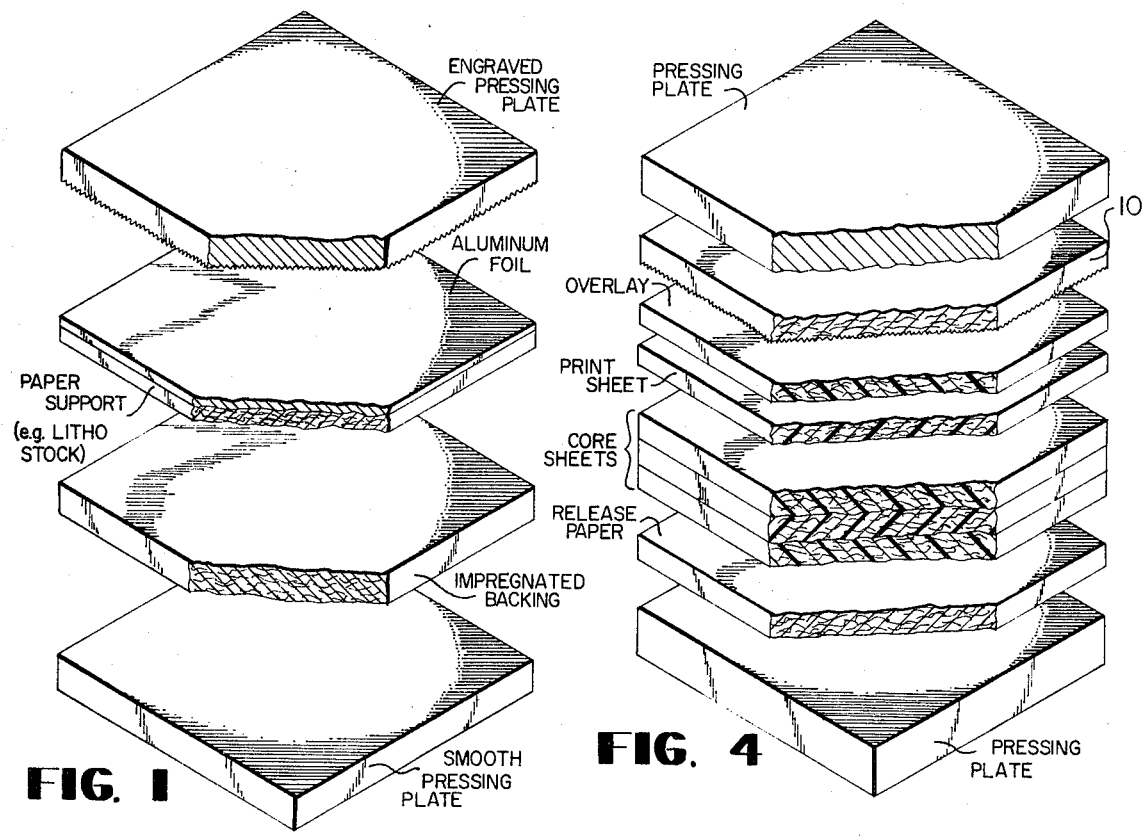
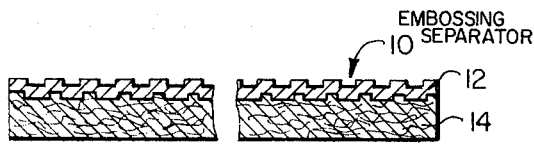
INVENTOR.
HERBERT I. SCHER
ISRAEL S. UNGAR
ATTORNEYS

United States Patent Office 3,674,619
Patented July 4, 1972

3,674,619
EMBOSSING SEPARATOR
Herbert I. Scher and Israel S. Ungar, Randallstown, Md.,
assignors to Esso Research and Engineering Company
Filed Oct. 13, 1969, Ser. No. 865,894
Int. Cl. B32b 3/00
U.S. Cl. 161—119                                8 Claims

ABSTRACT OF THE DISCLOSURE

An embossing separator is made by impregnating a fibrous material, such as paper, with a solution of a crystalline material having a sharp melting point, and bonding the so-impregnated paper to a suitable release layer such as aluminum foil with a hot embossing roll. This separator is then used to impart a three dimensional surface sculpture to a decorative laminate during the curing cycle thereof.

---

The present invention relates to an embossing separator and, more particularly, to a sparator sheet used in the production of laminates, which separator imparts a sculptured three-dimensional effect to the laminate produced.

The production of high pressure laminates is well known, having been carried out for many years. Generally, the procedures for forming such laminates involve providing phenolic resin impregnated paper core sheets and melamine resin decorative and overlay sheets, and pressing the stacked resin impregnated sheets under heat on the order of 250–310° F. and under pressure of approximately 800–1600 p.s.i. until the resins have become thermoset, thereby providing an extremely hard, attractive and permanent surfacing material known as a "high-pressure laminate" which has, for many years, found use as table tops, desk tops, counter tops, wall paneling, etc.

In the early years of the production of high-pressure laminates, generally only glossy surface laminates were produced by passing the resin-impregnated sheets between polished die plates under high pressure and temperature, although some attempts were made to provide laminates with some slight surface irregularity to give satin or textured finishes using roughened die plates or through after-treatments of the laminate. In more recent years, it has become increasingly desirable to provide various types of irregular surfaces, and these range from surfaces having relatively shallow depressions, such as matte or "textured" surfaces, to relatively deeply sculptured surfaces which have a noticeable three-dimensional effect, such as wood grain, leather or slate. With the rising costs of such natural products, it has become even more desirable to provide irregularly surfaced high-pressure laminates, which simulate these materials.

Thus, high-pressure decorative laminates are now manufactured with smooth surfaces, with "textured" surfaces or with deeply sculptured or embossed surfaces. In the latter case, a "textured" surface may be superimposed on the sculptured or embossed surface. Today, "textured" surfaces are normally obtained by the utilization of a paper parting sheet or a separating sheet between the laminate components and the smooth metal plate. These parting sheets, normally used but once and then thrown away, have small density variations across their surfaces. During the laminating procedure, the areas of lower density are compressed which causes an irregular surface thickness in the parting sheet, which irregularity is imparted to the laminate surface as it flows and cures under heat and pressure. Conventionally, the parting sheet is kraft paper bonded to aluminum foil having a thickness of about 0.3 mil, the aluminum foil being provided to permit release of the parting sheet from the cured laminate surface. Other texture imparting separator sheets are also used including various papers coated and/or impregnated with various resins and plastics such as fluorocarbon resins, silicone oils or resins, sodium alginate coated paper, etc. These separating sheets have found great usage in the art since they are *reliable* and produce highly acceptable products.

Where it has been desirable to provide deeply embossed or sculptured surfaces having surface depth variations of 0.001–0.007 that duplicate natural products such as slate, leather, wood and the like, or man-made designs such as fabric textures or abstract designs, it has generally been necessary to use either extremely expensive machined or etched steel plates or, alternatively, thermoset pressing plate dies of the types described in the Jenkins Pat. No. 2,606,855; the Michaelson et al. Pat. No. 3,303,081, or the Michaelson et al. Patent No. 3,311,520. However, the difficulty with the use of such thermoset molding plates involves the process of their formation, i.e., they must be cured or thermoset while being pressed and this requires not only an extended forming operation, but also relatively critical curing conditions which, for practical purposes, make a continuous embossing operation very time-consuming and expensive.

Molding elements have also been formed of thermoplastic material, but these are unsatisfactory because they are at least partly, and usually predominantly, amorphous or glassy and do not have sharp melting points. Such thermoplastic materials have a tendency to flow under the influence of pressure, particularly at elevated temperatures even below their so-called "melting point" and so are not suitable for use in the environments of high temperature and pressure used for the manufacture of high-pressure laminates.

Post embossing of the cured laminate has also been proposed, but this procedure has the serious defect of preventing any further heat-shaping operations. Accordingly, the most satisfactory methods for producing deeply embossed or sculptured laminates have required the use of expensive embossed metal molding plates or those described in the Michaelson et al. patents. While the expedients taught by the Michaelson et al. patents have provided a great advance in the art, there are many instances where it is preferable to use a cheaper and thinner separator such as is used in the formation of shallow "textured" laminates.

However, if a conventional parting sheet, such as kraft paper-aluminum foil, silicone treated paper, "Quillon" treated paper, etc., is embossed, and is then placed between the laminate components and smooth metal plate, and is finally pressed at 800–1500 p.s.i. pressure between 170 and 300° F., it will be found that the parting sheet, stripped from the cured laminate, has not transferred its embossed designs to the cured laminate surface. The reason for this is that the parting sheet has been flattened out as a result of the laminating pressure. Thus, it has not been possible to provide satisfactory separators in sufficiently inexpensive manner having a deeply sculptured surface which is capable of withstanding the high temperature and pressure conditions to which a separator is subjected during manufacture of the high-pressure laminate.

It is, accordingly, an object of the present invention to overcome the deficiencies of the prior art, such as indicated above.

It is another object of the present invention to provide for novel means to inexpensively produce embossed high-pressure laminates.

It is another object of the present invention to provide a deeply sculptured or embossed separator sheet for use in the manufacture of laminates, and which will withstand the high temperature and pressure conditions of high-pressure laminating procedures.

It is another object of the present invention to provide a deeply embossed parting sheet which is sufficiently inexpensive so that it can be thrown away after one usage.

It is another object of the present invention to provide a method of making a deeply sculptured separator for use in the manufacture of laminates.

These and other objects and the major advantages of the instant invention will be more apparent from the following detailed description of an embodiment thereof taken in conjunction with the drawing. This description of specific embodiments below will so reveal the general nature of the invention that others can, by applying current knowledge, readily modify and/or adapt such embodiments for various applications without departing from the generic concept, and therefore such adaptations and modifications should and are intended to be comprehended within the meaning and range of equivalents of the present invention.

In the drawing:

FIG. 1 shows, schematically, a method of making an embossed separator according to the present invention;

FIG. 2 shows another method of making an embossed separator;

FIG. 3 shows an embossed separator according to the invention; and

FIG. 4 shows a laminating procedure using the embossed separator of FIG. 3.

Briefly, the invention utilizes a parting sheet, comprised of a non-stick surface, and a carrier or backing sheet which has been impregnated with a crystalline compound. FIG. 3 shows such a separator 10 having an embossed non-stick facing 12 of substantially uniform thickness and a backing 14 of non-uniform thickness impregnated with a crystalline compound having a sharp melting point. The backing will preferably have a thickness on the order of 15–25 times as great as the facing.

In manufacture, the crystalline impregnated parting or separating sheet is embossed at a temperature above the crystalline melting temperature of the impregnant. The crystalline impregnant is so selected that its crystalline melting temperature is greater than the temperature at which the subsequently embossed separator is later to be used in the manufacture of the laminate; in use, the so-impregnated separator will act as an embossing mold and will impart its configuration to the laminate being manufactured without collapse of the separator due to fusion of the crystalline impregnant.

Thus, the present invention will be seen to obviate the difficulty of causing flattening of an embossed separator in an extremely simple manner. It is basic that in order to prevent the parting sheet or separator from flattening out, it is necessary to emboss it in such a way that the thickness of the sheet varies in accordance with the sculptured effect desired thereon and so that the sheet will not collapse. Thus, a parting sheet embossed on one surface, and smooth on the reverse surface, will not completely flatten out during pressing if it is sufficiently resistant to compressive force without fracture. The solid crystalline impregnant prevents collapse, fracture or flattening of the embossed separator. When using a sculptured separator as in the present invention, the resinous surface of the laminate component molded thereagainst will flow during the laminating procedure and conform to the embossed surface of the separator, and this will occur without collapse, fracture or flattening of the separator in spite of the high pressure and temperature of the high-pressure laminating environment.

The use of crystalline compounds which have a sharp melting point in accordance with the present invention overcomes the defects of the prior art. No curing or setting is required and the separators may be continuously formed quickly. The crystalline compounds are only slightly affected by pressure and, accordingly, if a carrier sheet is impregnated with such a crystalline compound that melts at a temperature above the laminating press temperature in which the separator is ultimately to be used, the separator incorporating such crystalline compounds will support laminating pressure with little or no deformation.

As indicated above, laminating temperatures for the manufacture of high-pressure laminates using a melamine-phenolic system are usually in the range of 250–310° F., and the normal laminating temperature is about 300° F. Therefore, any crystalline compound which melts above these temperatures will be suitable for use in the present invention. Of course, for the manufacture of separators in accordance with the present invention for subsequent use in the manufacture of low pressure laminates (acrylic systems, polyester systems, epoxy systems, etc.), which are usually molded at temperatures on the order of about 200–230° F., crystalline materials of even lower melting temperatures may be used. Accordingly, any crystalline compound which melts above the temperature at which the separator will be ultimately used can be incorporated into a carrier sheet which is then shaped into an embossed separator for later use in imparting the embossed design to a laminate during curing. Examples of suitable crystalline compounds are: sucrose which has a melting temperature of 365° F.; thiourea which has a melting temperature of 356° F.; citric acid which has a melting temperature of 310° F.; dicyandiamide which has a melting temperature of 411° F.; methyl-d glucoside which has a melting temperature of 334° F.; and d,l tartaric acid which has a melting temperature of 410° F.

Any suitable absorbent carrier sheet which is initially compressible and which can be impregnated is suitable for absorbing the crystalline compound. Usually, such an absorbent sheet will be of a fibrous nature and most usually, it will comprise some type of paper, such as common natural kraft. Other carriers may comprise woven fabric, non-woven fabric, pulp mats, fiberglass cloth or mats, asbestos pads, etc. The solvent used for saturating the carrier should be chosen to allow suitable pick-up of crystalline material by the paper. The preferred solvent is water, although any solvent capable of dissolving the selected impregnant may be used.

Once the crystalline compound is deposited in the carrier paper, it can be melted and reformed at a relatively low embossing pressure with no evolution of vapors, and at high embossing speeds (e.g., greater than 100 ft./min.). This avoids the difficulties inherent in the use of thermosetting materials, which must be cured during or after embossing. As indicated above, any crystalline material with melting point above the final press temperature contemplated may be used, provided that its melting point is sufficiently low so that flow may be provided during the molding and embossing of the separator.

One important feature of the present invention involves the quantity of crystalline material incorporated into the carrier sheet. Thus, it has been found that as little as 30% crystalline material, based on the total weight of the dried impregnated carrier, is not satisfactory since this quantity of impregnant does not provide sufficient bulk to prevent collapse during usage. Accordingly, there must be more than 30% by weight of crystalline material in the backing of the separator sheet. It is preferred that this percentage be greater than 35%, and best and most consistent results are obtained with at least 45% by weight of crystalline material. The non-stick parting surface of the separator can be foil or any other non-stick separator material which may be bonded to the backing simultaneous to embossing, or which may be applied in an operation prior to embossing. Commercially available parting sheets may be so used, including aluminum foil, silicone resin coated paper, etc. While the non-stick facing is preferably a preformed web, it may alternately be applied as a coating to the backing simultaneous with or prior to the embossing.

In a preferred embodiment for manufacturing the separators of the present invention, such as shown in FIG. 2, a web of paper, such as kraft paper 140, is passed continuously through an impregnating solution 142 of the crystalline material in a suitable solvent, such as water. After passage through the impregnating bath, the paper is continuously passed through a drying oven 144 where the solvent is evaporated. After removal from the drying oven the paper continuously passes to the nip of a pair of heated rollers 146 and 148, at least one of which is embossed so as to impress the desired sculptured effect into at least one surface of the impregnated paper. The rollers are, of course, heated to a temperature above the melting temperature of the crystalline compound so as to cause fusion of such compound to permit embossing of the carrier paper. Preferably at this point, or alternately immediately upstream of the rollers, a suitable facing material is deposited, coated on or laminated to the upper surface of the dried impregnated paper web. The passage of the dried impregnated backing and the non-stick facing, preferably aluminum foil web 120, through the nip of the heated rollers preferably effects simultaneous embossing and lamination, it being understood that the non-stick surface will be passed in facing relation to the embossed roller.

Where a one-side-good separator 10 is made the impregnated backing will contact a smooth roller. Where a two-side-good separator 10' is made as shown in FIG. 2, both rollers are embossed and a second aluminum foil web 120' is laminated to the other side of the impregnated paper. Regardless, the embossed separator is then permitted to cool and is cut into suitable lengths for subsequent use in the formation of high or low pressure laminates.

While the above operation is preferred, it will be understood that various modifications can be made. For example, the embossing may be carried out on the still wet paper in which case lower temperatures may be used for the heated rollers, and this may be followed by drying. However, this operation is not as satisfactory since control is not as great as in the preferred operation. Additionally, the separators may be formed in a batch procedure as shown in FIG. 1, using molding plates instead of rollers; however, this operation is not as satisfactory since it does not permit the high speed, continuous procedure, which gives the present invention many of its advantages. In certain modifications adhesive may be used between the non-stick material and the impregnated backing.

For a better understanding of the invention, some specific examples thereof will now be described, it being understood that these embodiments are to be intended as merely exemplary and in no way limitative.

EXAMPLE 1

A solution was made of 300 grams of sucrose as the crystalline material and 200 grams of water as the solvent. A sheet of 128 pound kraft paper, as the absorbent carrier backing, was impregnated with the solution and then was dried at 265° F. for 15 minutes. The pickup was 62% sucrose by weight based on the total weight of dried impregnated paper. The dried kraft-sucrose was then hot-embossed in a batch manner as follows:

A smooth steel plate was provided upon which the sucrose impregnated kraft was placed; on top of the sucrose impregnated kraft was placed a sheet of aluminum foil of 0.4 mil thickness on litho stock with the litho stock side in contact with the sucrose impregnated kraft; on top of the aluminum foil was placed an engraved steel plate. This assembly was pressed at 370° F. for 3 minutes. Some sugar flow was observed. After cooling it was found that the aluminum foil was bonded to the sucrose impregnated backing having an average thickness of about 8 mils, and the aluminum surface was embossed in a three-dimensional pattern complimentary to that of the engraved steel plate.

The so produced separator was used to impart reverse embossing to a standard laminate construction as shown in FIG. 4 as follows: on top of a steel plate and a sheet of release paper was placed a plurality of phenolic core sheets, and on top of the phenolic core was placed a print sheet and an overlay sheet, both melamine resin impregnated. The embossed separator 10 was then placed over the melamine impregnated overlay sheet with its embossed aluminum foil facing in contact with such overlay, and a steel plate was placed over the embossed separator backing. The assembly was pressed at 1000 p.s.i. and 300° F. for 20 monutes. A highly satisfactory high-pressure laminate was produced with an embossed surface.

EXAMPLE 2

A web of "newsprint" paper was continuously passed through a vat containing a solution of 40 pounds of citric acid in three gallons of water. The paper was impregnated with the solution and was dried to produce a pick-up of 50% citric acid by weight based on the total weight of the dried impregnated carrier. The impregnated and dried web was then continuously passed through the nip of a pair of rollers heated to 325° F., the bottom roller being smooth and the top roller being an embossing roller engraved in a "slate" pattern with depressions as great as 7 mils deep. Also continuously passed through the nip and above the dried impregnated carrier web was a web of paper backed aluminum foil. The rate of the webs passing through the heated rollers was fifty feet per minute. A continuous embossed separator having an aluminum foil facing emerged from the downstream end of the heated rollers, and the web was permitted to cool and was then cut into suitable lengths.

EXAMPLE 3

A solution was made containing 600 g. of potassium thiocyanate and 400 g. of water. Solution was kept at 120° F. to prevent crystallization. A sheet of 128 pound kraft paper was impregnated with the solution and then dried to a volatile content of about 2%. The pick-up was 52% based on the total weight of dried impregnated paper. The dried stock was then hot embossed and laminated to aluminum foil, as in Example 1, except that the press temperature was 350° F. After cooling, separator was used to produce an embossed high pressure laminate.

It is to be understood that the invention is not limited to the embodiments disclosed above which are illustratively offered, and that modifications may be made without departing from the invention. Thus, a two-sided separator may be made by application of foil to both sides of the impregnated carrier, and in this case both rollers may be heated embossed rollers.

What is claimed is:

1. A non-stick embossing separator sheet for use in the formation of three-dimensionally surfaced laminates in an environment of at least about 300 p.s.i. and at least 200° F. comprising
    a substantially incompressible backing sheet having a non-uniform thickness consisting essentially of an absorbent carrier impregnated with greater than 30% by weight based on the total weight of said impregnated backing of a crystalline material having a sharp melting temperature above the temperature of intended use of said embossing separator, and
    a coextensive, thin facing material having an embossed surface and a substantially uniform thickness, said facing material being non-stick with respect to the laminate components against which said embossing separator is to be used.

2. A non-stick embossing separator sheet in accordance with claim 1 capable of use in the formation of embossed, high-pressure laminates in an environment of high-pressure up to 1200 p.s.i. and temperatures up to just under 310° F., wherein said crystalline fusible material has a melting temperature of at least 310° F.

3. A non-stick embossing separator sheet in accordance with claim 1 wherein said crystalline fusible material is sucrose; thiourea; citric acid; dicyandiamide, methyl-d glucoside; d,l, tartaric acid; or potassium thiocyanate.

4. A non-stick embossing separator sheet in accordance with claim 1 wherein said facing material comprises a thin aluminum foil.

5. A non-stick embossing separator in accordance with claim 1 wherein said absorbent carrier comprises paper impregnated with 35–80% by weight of said crystalline fusible material based on the total dried weight of said carrier.

6. A non-stick embossing separator sheet in accordance with claim 1 having a second facing material on the opposite side of said backing material from said first-mentioned facing material, said second facing material having an embossed surface and a substantially uniform thickness and being non-stick.

7. A non-stick embossing separator sheet in accordance with claim 1 wherein said backing has a thickness on the order of about 15–25 times as great as said facing.

8. A non-stick embossing separator sheet in accordance with claim 1 wherein said sharp melting temperature of said crystalline material is no greater than about 410° F., said non-uniform thickness of said backing sheet being provided by pressing at a temperature greater than said melting temperature.

References Cited

UNITED STATES PATENTS

| 3,373,068 | 3/1968 | Grosheim et al. | 156—219 |
| 2,606,855 | 8/1952 | Jenkins | 156—219 |

FOREIGN PATENTS

| 743,059 | 9/1966 | Canada | 156—289 |

WILLIAM A. POWELL, Primary Examiner

U.S. Cl. X.R.

101—28, 32; 156—209, 219, 289, 323; 161—124, 125, 413